(12) United States Patent
Mizuta et al.

(10) Patent No.: US 9,761,915 B2
(45) Date of Patent: Sep. 12, 2017

(54) MANUFACTURIG METHOD FOR BATTERY

(71) Applicant: Automotive Energy Supply Corporation, Zama-shi, Kanagawa (JP)

(72) Inventors: Masatomo Mizuta, Kawasaki (JP); Aika Kimura, Yamato (JP)

(73) Assignee: AUTOMOTIVE ENERGY SUPPLY CORPORATION, Zama-shi (JP)

( * ) Notice: Subject to any disclaimer, the term of this patent is extended or adjusted under 35 U.S.C. 154(b) by 373 days.

(21) Appl. No.: 14/221,700

(22) Filed: Mar. 21, 2014

(65) Prior Publication Data
US 2014/0285208 A1  Sep. 25, 2014

Related U.S. Application Data

(63) Continuation of application No. PCT/JP2012/075145, filed on Sep. 28, 2012.

(30) Foreign Application Priority Data

Dec. 5, 2011  (JP) .................. 2011-265620

(51) Int. Cl.
*H02J 7/00* (2006.01)
*H02J 7/14* (2006.01)
(Continued)

(52) U.S. Cl.
CPC ......... *H01M 10/48* (2013.01); *H01M 2/0287* (2013.01); *H01M 10/0525* (2013.01); *H01M 10/0585* (2013.01)

(58) Field of Classification Search
USPC ....... 324/425, 426, 427, 428, 429, 430, 431, 324/432, 433, 434, 435; 320/137, 134,
(Continued)

(56) References Cited

U.S. PATENT DOCUMENTS 6,215,311 B1 *  4/2001  Miyamoto ........ H01M 10/0413
                                                    320/166
6,300,774 B1 * 10/2001  Lim ...................... G01R 31/18
                                                    198/345.3
(Continued)

FOREIGN PATENT DOCUMENTS

| JP | 2000-195565 A | 7/2000 |
| JP | 2001-236985 A | 8/2001 |

(Continued)

*Primary Examiner* — Alexis Pacheco
(74) *Attorney, Agent, or Firm* — Foley & Lardner LLP

(57) ABSTRACT

A method for inspecting a battery, comprising: a first withstanding voltage determination step of housing an electrode laminate within a package and applying a first voltage between a positive electrode terminal and a negative electrode terminal to perform a first withstanding voltage determination in a state in which an electrolyte solution is not poured in the package; and a second withstanding voltage determination step of applying a second voltage which is higher than the first voltage between the positive electrode terminal or the negative electrode terminal and metallic layers of pair of laminate films to perform a second withstanding voltage determination in the state in which the electrolyte solution is not poured in the package.

5 Claims, 2 Drawing Sheets

(51) Int. Cl.
*H01M 10/48* (2006.01)
*H01M 2/02* (2006.01)
*H01M 10/0525* (2010.01)
*H01M 10/0585* (2010.01)

(58) Field of Classification Search
USPC .................................. 320/116, 149, 132, 119
See application file for complete search history.

(56) References Cited

U.S. PATENT DOCUMENTS

| | | | |
|---|---|---|---|
| 6,392,413 | B2 | 5/2002 | Onishi et al. |
| 6,576,373 | B1* | 6/2003 | Iwamoto ............... H01M 4/131 |
| | | | 429/247 |
| 7,723,956 | B2* | 5/2010 | Tatebayashi ........ H01M 10/052 |
| | | | 320/119 |
| 7,859,226 | B2* | 12/2010 | Nakazawa ............. H01M 2/34 |
| | | | 320/134 |
| 2001/0011881 | A1* | 8/2001 | Emori .............. G01R 19/16542 |
| | | | 320/116 |
| 2001/0019270 | A1 | 9/2001 | Onishi et al. |
| 2005/0022369 | A1* | 2/2005 | Yang ................. H01M 10/0566 |
| | | | 29/623.1 |
| 2005/0242820 | A1* | 11/2005 | Kume ............... H01M 10/4285 |
| | | | 324/426 |
| 2007/0037049 | A1* | 2/2007 | Iijima ................. H01M 2/1061 |
| | | | 429/99 |
| 2008/0186030 | A1* | 8/2008 | Kasamatsu ........... H01M 10/44 |
| | | | 324/426 |
| 2009/0246607 | A1* | 10/2009 | Shinyashiki ........ H01M 10/482 |
| | | | 429/90 |
| 2011/0012604 | A1* | 1/2011 | Tsujiko ................. H01M 10/48 |
| | | | 324/427 |
| 2012/0133382 | A1* | 5/2012 | Sato .................... G01R 31/2889 |
| | | | 324/754.07 |
| 2012/0146674 | A1* | 6/2012 | Eckert ................ G01R 31/3187 |
| | | | 324/750.3 |
| 2012/0186071 | A1 | 7/2012 | Yamashita et al. |
| 2013/0174393 | A1* | 7/2013 | Inahara ................. H01G 11/22 |
| | | | 29/25.03 |
| 2014/0285208 | A1* | 9/2014 | Mizuta ................. H01M 10/48 |
| | | | 324/433 |

FOREIGN PATENT DOCUMENTS

| | | |
|---|---|---|
| JP | 2002-324572 A | 11/2002 |
| JP | 2004-273216 A | 9/2004 |
| JP | 2005-251685 A | 9/2005 |
| JP | 2004-111371 A | 4/2008 |
| JP | 2010-032346 A | 2/2010 |
| WO | WO 2011/040446 A1 | 4/2011 |

* cited by examiner

MANUFACTURIG METHOD FOR BATTERY

This application is a continuation application from International Application PCT/JP2012/075145, the International Filing Date of which is Sep. 28, 2012.

BACKGROUND OF THE INVENTION (a) Field of the Invention

The present invention relates to a method for inspecting a cell (or a battery).

(b) Description of the Related Art

A cell (but hereinafter called, a battery) in which an electrode laminate constituted by a plurality of electrodes and separators grasped between the mutual electrodes is sealed by means of a pair of laminate films is present.

In such a battery as described above, if a short circuit between a positive electrode and a negative electrode occurs, there is a possibility of not achieving a sufficient function as the battery. In order to avoid this possibility, Patent Documents 1 and 2 describe that a voltage between the positive electrode and the negative electrode is applied in a state before the electrode laminate is inserted into an inside of a package constituted by laminated films and an electrode solution is poured in the package to measure an electric current to detect a presence or absence of the short circuit.

According to Patent Documents 1 and 2, a defective product can be removed by detecting the short circuit between the positive electrode and the negative electrode. However, generally, the laminate films have inner layers of metallic layers such as aluminum layers. Even in a case where the short circuit occurs between the metallic layers within the laminate films and the positive electrode or the negative electrode, there is a possibility of not performing the sufficient function as the battery.

Patent Documents 3 and 4 describe that a presence or absence of the short circuit is detected by measuring an insulation resistance between the metallic layer within a laminate film and the positive electrode or the negative electrode in a state in which an electrode laminate and an electrolyte solution are inserted into an inside of a package constituted by the laminate film and the package is sealed so that the battery is completed.

PRE-PUBLISHED DOCUMENT

Patent Document

Patent Document 1: Japanese Patent Application First Publication (tokkai) No. JP2010-032346
Patent document 2: Japanese Patent Application First Publication (tokkai) No. JP2001-236985
Patent document 3: Japanese Patent Application First Publication (tokkai) No. JP2002-324572
Patent document 4: Japanese Patent Application First Publication (tokkai) No. JP2005-251685

SUMMARY OF THE INVENTION

However, as described in Patent Documents 3 and 4, in a case where the insulation resistance is measured after pouring the electrolytic solution in the package, an insulation (quality) is lowered accompanied by the poured electrolyte solution functioning as a kind of a current conducting passage. Even in this case, a determination is made that the short-circuit has occurred. Consequently, there is a possibility that a defective product is determined to be found and is removed even if it is a non-defective battery (no inconvenience in terms of a structure is not present).

In addition, in the measurement of the insulation resistance, even if a state of resulting in the short circuit can be determined, the state of a possibility of resulting in the short circuit (a, so-called, potential short circuit) cannot be determined. That is to say, even if the insulation resistance indicates a normal valve, a state in which there is a high possibility that the short circuit would occur in the future cannot be detected.

It is, therefore, an object of the present invention to provide a method for inspecting a battery which can detect the state in which an electrical short circuit has occurred and the state in which there is a possibility of generating the electrical short circuit effectively.

The feature of the present invention is that a method for inspecting a battery, the battery comprising: an electrode laminate in which a positive electrode, a porous separator, and a negative electrode are laminated; a positive electrode terminal connected to the positive electrode; a negative electrode terminal connected to the negative electrode; a package including a metallic layer and a resin layer disposed on an inside of the metallic layer and in an inside of which the electrode laminate and an electrolyte solution are housed and sealed in a state in which one end of each of the positive electrode and the negative electrode is projected externally, the method comprising: a first withstanding voltage determination step of housing the electrode laminate within the package and applying a first voltage between the positive electrode terminal and the negative electrode terminal in a state in which the electrolyte solution is not poured in the package to perform a first withstanding voltage determination; a second withstanding voltage determination step of applying a second voltage which is higher than the first voltage between the positive electrode terminal or the negative electrode terminal and the metallic layer to perform a second withstanding voltage determination in a state in which the electrolyte solution is not poured in the package.

According to the method for inspecting the battery, a product in which an insulation failure has occurred or in which there is a high possibility of generating the insulation failure in the future can be detected in advance and removed. Thus, a waste in a manufacturing process of the battery can be reduced and an improvement of a production efficiency and a reduction in a manufacturing cost can be achieved.
In addition, an excessive detection is not carried out and a sufficient inspection can be carried out.

DETAILED DESCRIPTION OF THE INVENTION

Hereinafter, a preferred embodiment according to the present invention will be described.

Figure 1A:
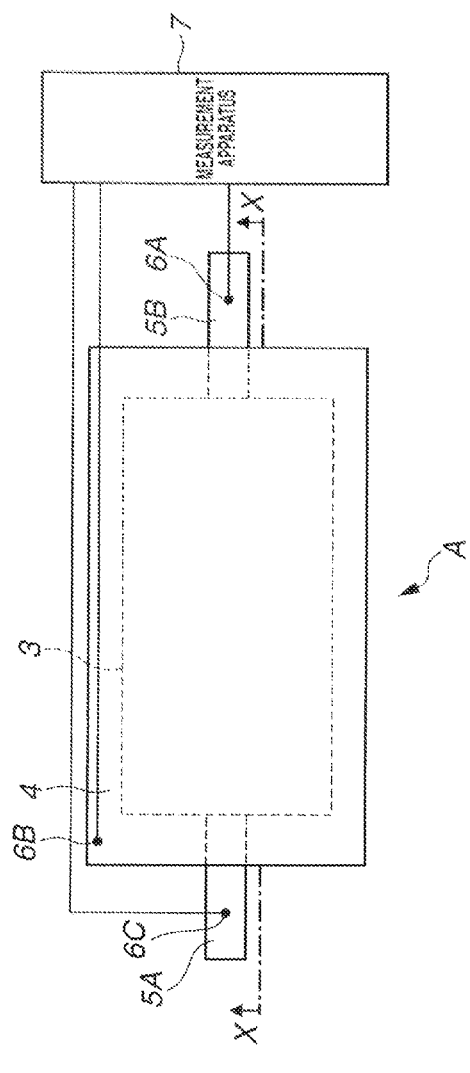
FIG. 1(a) is a rough plan view representing a method for inspecting a battery according to the present invention and FIG. 1(b) is a cross sectional view cut away along a line of X-X in FIG. 1(a).
Figure 1B:
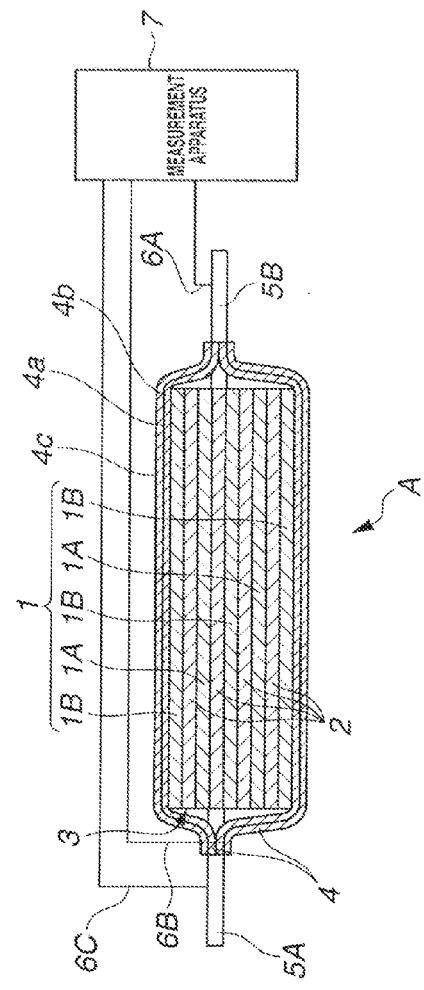

First, a structure of a battery which is an object of a method for inspecting the battery according to the present invention will be explained. FIG. 1A shows a plan view of a lithium ion (secondary) battery and FIG. 1B shows a cross sectional view cut away along a line X-X shown in FIG. 1A. As shown in FIGS. 1A and 1B, battery A is constituted by an electrode laminate in which a plurality of electrodes 1 and a plurality of separators 2 are alternately laminated and which is enclosed within a package (an exterior body) constituted by a pair of laminate films mutually joined.

It should be noted that the package which is herein called includes a state in which the whole periphery of the pair of laminate films is joined and is completely sealed and a state in which a part of peripheral edge sections of the laminate films is left in a non-joint state in a manufacturing process Although not shown but, specifically, a positive electrode 1A is an application of a positive electrode active material on a positive electrode collective foil such as aluminum and so forth. As the positive electrode active material, a lithium-manganese oxide or a lithium-nickel oxide can be used. A negative electrode 1B is an application of a negative electrode active material on a negative electrode collective foil made of a copper or so forth. As the negative electrode active material, a carbon system material such as a graphite or amorphous carbon can be used. Electrode laminate 3 is constituted by a pile up of positive electrodes 1A and negative electrodes 1B with separators 2 interposed between respective positive electrodes 1A and respective negative electrodes 1B. This electrode laminate 3 is enclosed by a pair of laminate films 4.

A positive electrode terminal 5A which is one of electrode terminals is electrically joined on the positive collective electric foils of positive electrodes 1A. A negative electrode terminal 5B which is the other electrode terminal is electrically joined to the negative electrode foils of negative electrodes 1B.

Then, as shown in FIGS. 1(a) and 1(b), while their respective parts of positive electrode terminal 5A and negative electrode terminal 5B are projected to an external of the pair of laminate films 4, The pair of laminate films 4 have peripheral edge sections overlapped with each other and which are mutually joined by means of a heat seal or so forth. In this way, pair of laminate films 4 having the peripheral edge sections mutually joined constitute the package housing electrode laminate 3.

Each of pair of laminate films 4 is so structured that one surface (a surface which is located at an inside, in the package of the complete state) of a metallic layer 4a (for example, an aluminum layer) is covered with an insulation quality resin layer (an inner layer) which is heat sealable and the other surface (a surface which is located at an outside, in the package of the complete state) of metallic layer 4a is covered with the other resin layer (outer layer) which provides a protective layer.

As separators 2, various kinds of materials can be used but polypropylene or so forth is in a general use. In addition, as an electrolyte solution, polycarbonate, ethylene carbonate, dimethyl ether, diethyl ether, or so forth can be used.

Figure 2:
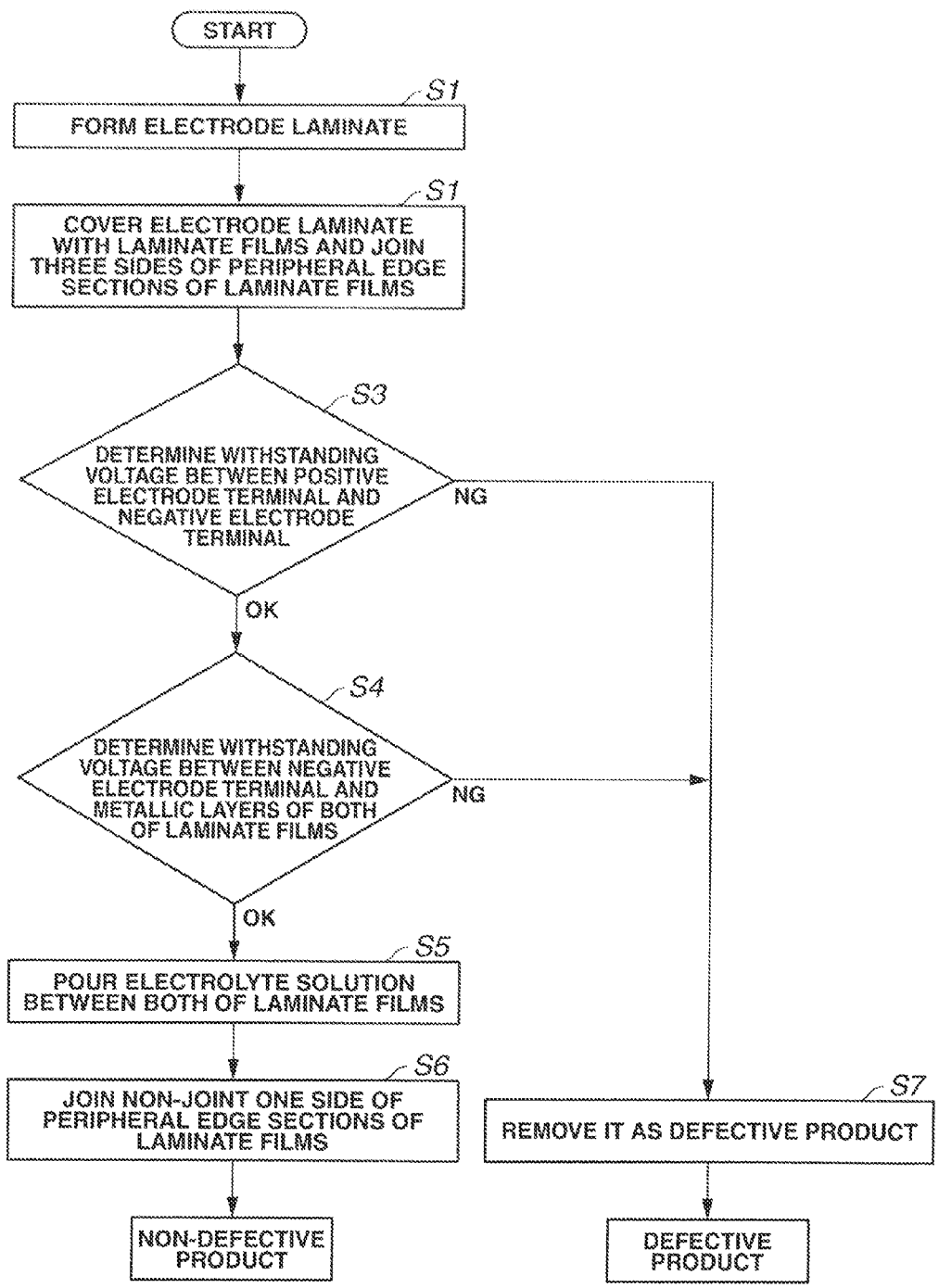
FIG. 2 is a flowchart representing a manufacturing method for the battery including a method for inspecting the battery in a preferred embodiment.

An inspection apparatus roughly shown in FIGS. 1(a) and 1(b) is used for the inspection method for battery A in this embodiment. This inspection apparatus includes: three probes 6A, 6B, and 6C; and a measurement apparatus 7 connected to each probe 6A, 6B, and 6C to enable a measurement and determination of electric characteristics. In this embodiment, in a midway through the manufacturing process of battery A, namely, at a stage before an injection (a pouring) of electrolyte solution in the package, two withstanding voltage determinations are made as shown in a procedure in a flowchart shown in FIG. 2.

Specifically, at first, electrode laminate 3 is formed and electrode terminals 5A, 5B are electrically connected to positive electrodes 1A of electrode laminate 3 and negative electrodes 1B thereof respectively (a step S1). Then, both surfaces of electrode laminate 3 are covered with pair of laminate films 4 so that the peripheral edge sections of three sides of the laminate films are mutually joined by a method of a heat seal or so forth (a step S2). At this time, a part of electrode terminals 5A, 5B is heat sealed in a state in which part of each of electrode terminals 5A, 5B is projected to the outside of pair of laminate films 4. The remaining one side of the laminate film is left in a non-joint state since the one side is used as an injection (pouring) inlet for the electrolyte solution.

In this state, probe 6A of the inspection apparatus is brought in contact with one of the electrode terminals (negative electrode terminal 5B connected to negative electrodes 1B in this embodiment), probe 6B is brought in contact with metallic layers 4a of pair of laminate films 4, and probe 6C is brought in contact with the other electrode terminal (positive electrode terminal 5A connected to positive electrodes 1A in this embodiment). A method of bringing probe 6B in contact with metallic layers 4a may be such that probe 6B is directly contacted on metallic layers 4a with protective layers of outer layers 4c of laminate films 4 exfoliated or may be such that a needle-shaped probe 6B is used to penetrate through the protective layers which are outer layers 4c of pair of laminate films 4 to be contacted on metallic layer 4a. It should be noted that, as shown in FIG. 1(b), probe 6B is penetrated through a joint portion of the peripheral edge sections of the pair of laminate films 4 (a position at which electrode laminate 3 is not present). That is to say, needle-shaped probe 6B is brought in contact with both of metallic layers 4a of upper side laminate film 4 and of lower side laminate film 4. In this state, the following two withstand voltage determination steps are carried out.

At a first withstanding voltage determination step (a step S3), a withstanding voltage determination between positive electrode terminal 5A and negative electrode terminal 5B is made. Specifically, with a predetermined voltage (a first voltage lower than a withstanding voltage of the separators, for example, 500V) applied between probe 6A and probe 6C to confirm whether a dielectric breakdown has occurred. If the breakdown has occurred, a working operation for the battery is halted and the product which is determined that the dielectric breakdown has occurred is handled as a defective product (a step S7). In a case where the breakdown does not occur even in a case where the first voltage is applied between probe 6A and probe 6C, a determination that the insulation between positive electrode 5A and negative electrode 5B is favorable is made so that the manufacturing process is continued.

At a second withstanding voltage determination step (a step S4), a withstanding voltage determination between negative electrode 5B and both of metallic layers 4a of laminate films 4 is made. Specifically, another predetermined voltage (a second voltage which is higher than the first voltage, for example, 1000 volts) is applied between probe 6A and probe 6B to confirm whether the dielectric breakdown occurs. If the breakdown occurs, the inspection operation is halted and the product to be inspected is handled as the defective product.

In a case where the breakdown does not occur even when the second voltage is applied between probe 6A and probe 6B, a determination that the insulation between negative electrode terminal 5B and metallic layers 4a of pair of laminate films 4 is favorable is made and the manufacturing process is continued.

Specifically, the electrolyte solution is injected (poured) between both laminate films 4 from one side of the peripheral edge sections of the pair of laminate films 4 which is non-joint (a step S5). Then, the one side of the peripheral edge section of laminate films 4 which is non-joint is mutually joined through the method of the heat seal and sealed (a step S6).

Thus, battery A is completed whose electrode laminate 3 is sealed by means of pair of laminate films 4. Thereafter, a charging is carried out for battery A.

In the preferred embodiment, at a time point before the electrolyte solution is poured in the package in a midway through the manufacturing process of battery A, namely, in a state in which electrode laminate 3 is housed within the package and the electrolyte solution is not poured in the package, the two withstanding voltage determination steps S3, S4 are carried out to detect and remove the product in which the insulation failure has occurred or in which there is a high possibility of the occurrence of the insulation failure in the future. Hence, since step S5 in which the electrolyte solution is poured in the package (between the pair of laminate films) and the subsequent step S6 are not carried out for the defective product described above, a waste of the manufacturing process can be reduced and an improvement of the product efficiency and a reduction of the manufacturing cost can be achieved.

It should be noted that a sequence between step S3 in which the withstanding voltage determination between positive electrode terminal 5A and negative electrode terminal 5B is made and step S4 in which the withstanding voltage determination between metallic layers 4a of laminate films 4 and negative electrode terminal 5B is made may be exchanged. If possible, step S3 and step S4 may simultaneously be carried out.

According to the present invention, the withstanding voltage determination (step S3) between positive electrode terminal 5A and negative electrode terminal 5B and the withstanding voltage determination between metallic layers 4a of laminate films 4 and negative electrode terminal 5B (step S4) are carried out before the electrolyte solution is poured in the package in the midway through the manufacturing process of battery A. Thus, the product which has a possibility of an occurrence of the electrical short circuit can be detected. However, if the voltage application of step S3 is carried out at the same voltage level as step S4, an excessive detection is resulted so that the product is determined to be defective and removed in spite of the fact that there is no defect of the possibility of resulting in the short circuit, since the separators are porous. Hence, a failure rate becomes high so that a manufacturing cost is raised.

On the other hand, the insulation quality resin layer (inner layer 4b) which is heat sealable as described above is demanded to have a high reliability such as no leakage of liquid even after the heat seal is carried out. Thus, as the resin layer described above, a resin having no cavity or extremely fewer cavities is used. Then, if a low voltage is applied in step S4 in the same way as step S3, there is a possibility of determining the product (a product which has a potential inconvenience) which has the possibility that the insulation failure occurs in the future as the non-defective product. The inventors have noticed such a problem that, if steps S3 and S4 are carried out under the same voltage condition, the inspection with a favorable accuracy cannot be made.

As described above, step S4 is carried out by applying the second voltage which is higher than the applied voltage (the first voltage) at step S3. Thus, at step S3, by applying the voltage at the level at which the potential inconvenience can be detected, the product which has the possibility of occurrence of failure in the future can be removed as the defective product. At step S4, the possibility of the short circuit on inner layer 4b can accurately be detected by applying a higher voltage.

It should be noted that a state in which there is a high possibility of occurring the short circuit in the future includes such a state that, although a heat conductive foreign matter is stuck in the resin layers of the laminate films, it does not reach to the short circuit according to the angle of stick in the resin layers but, thereafter, there is a possibility of occurring the short circuit due to a change of the angle of sticking in the resin layer. In such a case as described above, the application of high voltage causes a breakdown to actively be generated in a part of the resin layer at which the foreign matter is stuck. Thus, the product can be removed as the defective product.

In this way, the product which has a high possibility of occurring the electrical short circuit can previously be removed. By completing the battery which has low possibility of generating the short circuit, a reliability of manufacturing the battery can be enhanced. In addition, the wasteful manufacturing process is not carried out and the manufacturing cost can be suppressed to be low.

In the explanation of each preferred embodiment, although electrode laminate 3 in which a plurality of positive electrodes 1A, a plurality of negative electrodes 1B, and a plurality of separators 2 are alternately laminated is exemplified, positive electrode 1A, separator 2, and negative electrode 1B are laminated for each of layers and are wound as a winding type electrode laminate 3 can be used.

In addition, the package is not limited to a type of the package in which the pair of laminate films 4 are overlapped and the peripheral edge sections of the films is joined. The package may be a type in which the peripheral edge sections are folded. Furthermore, the package is not limited to a bag shape but may be a can type which is constituted by a can casing and a cap section. In this case, the can casing may be constituted by a metallic layer in which the resin layer is formed at an inside of the casing. Then, it is desirable that one of positive electrode terminal 5A and negative electrode terminal 5B is connected to the can casing and the other thereof is projected from the cap section.

The present invention is not limited to the individual structures exemplified above but may be combined without departing from the sprit and scope of the present invention.

The contents of International Application of PCT/JP2012/075145 filed Sep. 28, 2012 are herein incorporated by reference.

What is claimed is:

1. A manufacturing method for a battery, the battery comprising: an electrode laminate in which a positive electrode, a porous separator, and a negative electrode are laminated; a positive electrode terminal connected to the positive electrode; a negative electrode terminal connected to the negative electrode; a package including a metallic layer and a resin layer disposed on an inside of the metallic layer and in an inside of which the electrode laminate and an electrolyte solution are housed and sealed in a state in which one end of each of the positive electrode terminal and the negative electrode terminal is projected externally, the method comprising:

forming the electrode laminate by an alternate lamination of a plurality of the positive electrodes and the negative electrodes and a plurality of the porous separators, forming the package comprising a pair of laminate films, each laminate film including the metallic layer and the resin layer, by joining mutual peripheral edge sections of the pair of laminate films in a state in which respective parts of the positive electrode terminal and the negative electrode terminal are projected externally, a top surface and a bottom surface of the electrode laminate each being covered with a respective one of the pair of laminate films; and inspecting the battery, wherein inspecting the battery comprises:
- a first withstanding voltage determination step of housing the electrode laminate within the package and applying a first voltage between the positive electrode terminal and the negative electrode terminal in a state in which the electrolyte solution is not poured in the package to perform a first withstanding voltage determination; and
- a second withstanding voltage determination step of applying a second voltage which is higher than the first voltage between the positive electrode terminal or the negative electrode terminal and a metallic layer to perform a second withstanding voltage determination in the state in which the electrolyte solution is not poured in the package.

2. The manufacturing method for the battery as claimed in claim 1, wherein each of the resin layers has no cavity or extremely fewer cavities.

3. The manufacturing method for the battery as claimed in claim 1, wherein the first withstanding voltage determination step and the second withstanding voltage determination step are carried out with probes contacting the positive electrode terminal, the negative electrode terminal, and the metallic layers.

4. The manufacturing method for the battery as claimed in claim 1, wherein in the second withstanding voltage determination step, the second voltage is applied between the negative electrode terminal and the metallic layer, and a withstanding voltage measurement between the negative electrode terminal and the metallic layers of the pair of laminate films is made.

5. The manufacturing method for the battery as claimed in claim 1, wherein the battery is a lithium ion secondary battery.

* * * * *